(12) United States Patent
Olivier

(10) Patent No.: US 10,688,872 B2
(45) Date of Patent: Jun. 23, 2020

(54) METHOD FOR DRIVING AND THERMALLY REGULATING A RANGE EXTENDING SYSTEM FOR A MOTOR VEHICLE

(71) Applicants: RENAULT S.A.S., Boulogne Billancourt (FR); PHINERGY LTD, Lod (IL)

(72) Inventor: Gerard Olivier, Bougival (FR)

(73) Assignees: RENAULT S.A.S., Boulogne Billancourt (FR); PHINERGY LTD, Lod (IL)

( * ) Notice: Subject to any disclaimer, the term of this patent is extended or adjusted under 35 U.S.C. 154(b) by 367 days.

(21) Appl. No.: 15/520,563

(22) PCT Filed: Oct. 21, 2015

(86) PCT No.: PCT/EP2015/074414
§ 371 (c)(1),
(2) Date: Apr. 20, 2017

(87) PCT Pub. No.: WO2016/062783
PCT Pub. Date: Apr. 28, 2016

(65) Prior Publication Data
US 2017/0313195 A1 Nov. 2, 2017

(30) Foreign Application Priority Data
Oct. 21, 2014 (FR) ..................... 14 60122

(51) Int. Cl.
*B60L 50/61* (2019.01)
*B60L 11/12* (2006.01)
(Continued)

(52) U.S. Cl.
CPC .............. *B60L 11/123* (2013.01); *B60K 6/20* (2013.01); *B60L 3/0061* (2013.01); *B60L 50/61* (2019.02);
(Continued)

(58) Field of Classification Search
CPC .......... B60L 58/33; B60L 58/12; B60L 58/20; B60L 58/26; B60L 50/61; B60L 3/0061;
(Continued)

(56) References Cited

U.S. PATENT DOCUMENTS 5,264,764 A * 11/1993 Kuang ................. B60K 6/46
318/139
6,330,925 B1 * 12/2001 Ovshinsky ............. B60K 6/24
180/65.245
(Continued)

FOREIGN PATENT DOCUMENTS

EP   1 256 476 A2   11/2002
EP   2 020 724 A1   2/2009
(Continued)

OTHER PUBLICATIONS

International Search Report, dated Jan. 20, 2016, from corresponding PCT application.

*Primary Examiner* — Hung Q Nguyen
(74) *Attorney, Agent, or Firm* — Young & Thompson

(57) ABSTRACT

Disclosed is a method for driving an range extending system for a motor vehicle equipped with an electric motor (2) adapted to be supplied with electric current by a traction battery (3), the range extending system including an range extender (1) that can be activated to supply the traction battery and/or the electric motor with electric current and a cooling circuit (10) for the range extender, in which provision is made to acquire a state of charge of the traction battery and, if the state of charge is below a charge threshold, to activate the range extender. Additionally, the charge threshold has a variable value, which is a function of an outside temperature of the air outside the motor vehicle.

20 Claims, 1 Drawing Sheet

(51) Int. Cl.
    *B60L 3/00*      (2019.01)
    *B60L 58/33*     (2019.01)
    *B60L 58/12*     (2019.01)
    *B60L 58/26*     (2019.01)
    *B60L 58/20*     (2019.01)
    *B60K 6/20*      (2007.10)

(52) U.S. Cl.
    CPC .............. *B60L 58/12* (2019.02); *B60L 58/20* (2019.02); *B60L 58/26* (2019.02); *B60L 58/33* (2019.02); *B60L 2240/36* (2013.01); *B60L 2240/445* (2013.01); *B60L 2240/662* (2013.01); *Y02T 10/6217* (2013.01); *Y02T 10/7005* (2013.01); *Y02T 10/7044* (2013.01); *Y02T 10/7066* (2013.01); *Y02T 10/7077* (2013.01); *Y02T 10/7291* (2013.01); *Y02T 90/16* (2013.01); *Y02T 90/34* (2013.01)

(58) Field of Classification Search
    CPC .......... B60L 2240/36; B60L 2240/445; B60L 2240/662; B60K 6/20; Y02T 10/7066; Y02T 10/6217; Y02T 10/7005; Y02T 10/7044; Y02T 90/34; Y02T 10/7077; Y02T 90/16; Y02T 10/7291
    See application file for complete search history.

(56) References Cited

U.S. PATENT DOCUMENTS

| | | | |
|---|---|---|---|
| 2002/0098414 A1* | 7/2002 | Ovshinsky | B60K 1/04 429/223 |
| 2005/0162106 A1* | 7/2005 | Cho | B60K 6/46 318/139 |
| 2011/0115439 A1 | 5/2011 | Kim | |
| 2012/0215426 A1* | 8/2012 | Sato | B60K 6/46 701/108 |
| 2012/0290161 A1 | 11/2012 | Takeda et al. | |
| 2014/0074331 A1 | 3/2014 | Shin et al. | |

FOREIGN PATENT DOCUMENTS

| | | |
|---|---|---|
| JP | 2005/335443 A | 12/2005 |
| JP | 2011/163282 A | 8/2011 |
| WO | 2013/167267 A2 | 11/2013 |

* cited by examiner

METHOD FOR DRIVING AND THERMALLY REGULATING A RANGE EXTENDING SYSTEM FOR A MOTOR VEHICLE

TECHNICAL FIELD TO WHICH THE INVENTION RELATES

The present invention relates generally to the field of the thermal regulation of the components of a motor vehicle with electric or hybrid drive.

It applies to the motor vehicles equipped with:
an electric motor supplied with current by a traction battery, and
a range extending system comprising a range extender that can be activated to supply the electric motor and/or the traction battery with electric current, and a cooling circuit for the range extender.

It relates more particularly to a method for controlling such a range extending system, according to which provision is made to acquire a state of charge of the tranction battery and, if the state of charge is below a charge threshold, to activate the range extender.

TECHNOLOGICAL BACKGROUND

A motor vehicle with electric propulsion has two major drawbacks: its lower range than a heat engine vehicle of the same category and the significant time it takes to charge its traction battery.

The solution currently used to remedy these two drawbacks consists in equipping the motor vehicle with a range extender which for example takes the form of an additional battery, a small internal combustion engine or a fuel cell.

Such a range extender is for example presented in the document WO2013167267.

This autonomy extender operates with an optimum efficiency at a given temperature, which is generally different from that to which the other electrical components of the vehicle have to be cooled. A specific cooling circuit is then generally provided to cool the range extender.

This range extender is likely to be used in any situation. It is in effect generally controlled in such a way that as soon as the state of charge of the traction battery passes below a predetermined charge threshold (for example 20%), the range extender is used to supply the electric motor and/or the traction battery with current.

This situation can therefore occur in situations of extreme heat, notably when the vehicle is immobilized in a traffic jam and the outside temperature is very high.

Difficulties ensue for cooling the range extender to the temperature at which it exhibits an optimum efficiency (notably when the range extender is used at its nominal power).

The solution currently used when the cooling circuit is no longer able to sufficiently cool the range extender consists in reducing the electrical power delivered by this range extender, such that it generates less heat and the cooling circuit can keep its temperature at the optimum temperature.

It will be understood that this solution is not satisfactory because it generates a significant reduction in the performance levels of the motor vehicle when the heat conditions are limiting.

OBJECT OF THE INVENTION

In order to remedy the above-mentioned drawback of the prior art, the present invention proposes, when the heat conditions are limiting, anticipating the use of the cooling circuit of the range extender.

More particularly, according to the invention, a control method is proposed as defined in the introduction, in which the condition for activating the range extender is a function of at least the outside temperature of the air outside the motor vehicle. Preferably, the charge threshold (below which the range extender is activated) may have a variable value, which may be a function of the outside temperature.

Thus, by virtue of the invention, when the heat conditions are limiting, there is no wait for the traction battery to be greatly discharged before using the range extender.

On the contrary, the use of the range extender begins earlier, so as to activate the cooling circuit earlier also.

It is thus possible to begin cooling the coolant circulating in the cooling circuit earlier. It is then possible, for example, to use it when the vehicle is running at a brisk pace, which makes it possible to cool the coolant more effectively by using a reduced quantity of electrical energy, which is advantageous since there is no longer a wait to encounter the most extreme heat conditions (vehicle stopped, for example in traffic congestion) to use it.

Another advantage is that, the state of charge of the main traction battery being still high, if the temperature of the range extender reaches a maximum temperature beyond which it risks being damaged, it is possible to reduce the power developed by this range extender and once again draw more on the charge of the main traction battery to supply the electric motor with current.

To sum up, the thermal inertia of the coolant and of the range extender is used to delay the temperature rise of the range extender when the heat conditions become extreme, by exploiting the phases in which the vehicle is running at a brisk pace.

The solution is therefore economical since it does not require any dimensioning of the radiators of the vehicle as a function of the most extreme heat conditions.

It is also economical in energy terms, since it makes it possible to use the cooling circuit when the conditions are most favourable.

Other advantageous and nonlimiting features of the control method according to the invention are as follows:
given an optimum temperature at which the range extender exhibits a maximum efficiency, when the range extender is activated and the outside temperature is below a temperature threshold, the cooling circuit is controlled in such a way that it keeps the range extender at the optimum temperature;
given a maximum temperature beyond which the range extender risks being damaged, when the range extender is activated and the outside temperature is above said temperature threshold, the cooling circuit and the range extender are controlled in such a way that the range extender exhibits a temperature above the optimum temperature and below the maximum temperature;
when the range extender is activated and the outside temperature is above said temperature threshold, the cooling circuit and the range extender are controlled as a function of the speed of the motor vehicle;
when the outside temperature is above said temperature threshold, the cooling circuit is controlled in the activated state as soon as the range extender exhibits a temperature above a starting threshold which is strictly below the optimum temperature;
the motor vehicle comprising an interior and an air conditioner adapted to cool the interior, when the range extender is activated and the outside temperature is above said temperature threshold, the cooling circuit and the range extender are controlled as a function of the electrical power consumed by the air conditioner (and possibly as a function of the outside temperature); when the outside temperature is above a temperature threshold, after the range extender has been deactivated, the cooling circuit is controlled in such a way that it reduces the temperature of the range extender to just below a predetermined limit temperature.

DETAILED DESCRIPTION OF AN EXEMPLARY EMBODIMENT

The description which follows in light of the attached drawings, given as nonlimiting examples, will give a good understanding of what the invention consists of and how it can be produced.

In the attached drawings:

FIG. 1 shows different components of a motor vehicle with electric propulsion.

Figure 1:
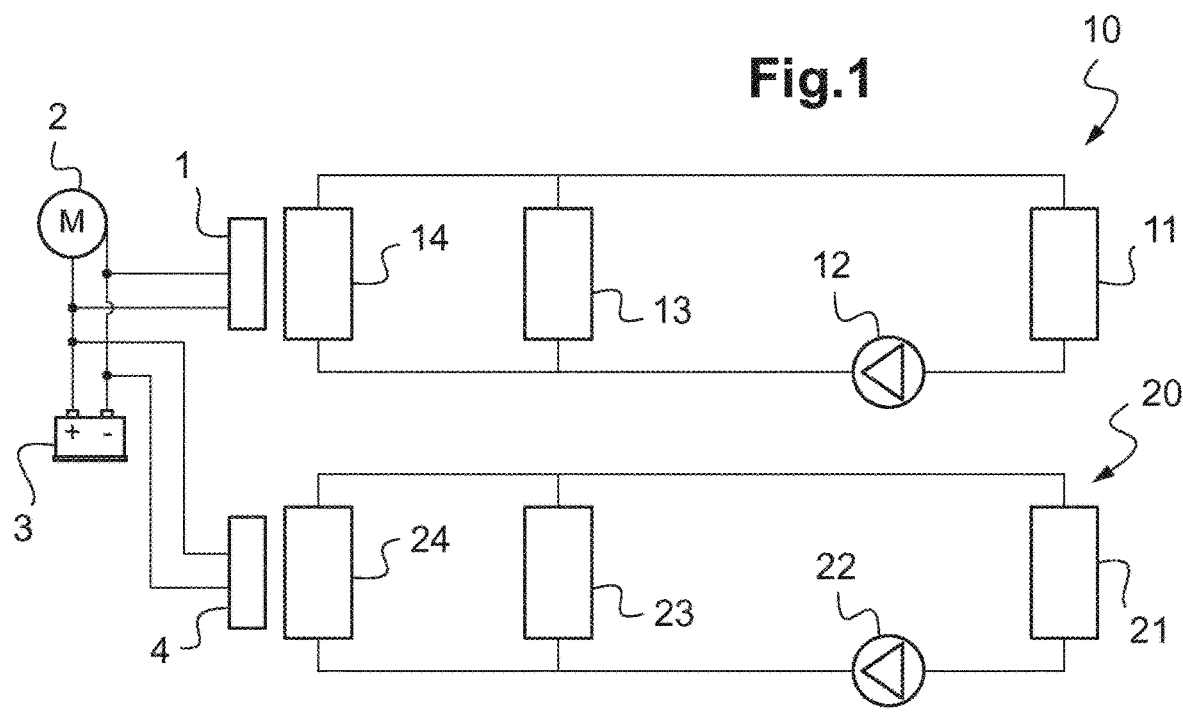
FIG. 1 is a schematic view of different electrical components and of cooling circuits of a motor vehicle.

As this FIG. 1 shows, the motor vehicle comprises an electric motor 2 for actuating the drive wheels of the vehicle.

It also comprises a traction battery 3 for supplying this electric motor 2 with current. This traction battery 3 can for example be of the lithium-ion type.

Here, the motor vehicle further comprises a charger 4 making it possible to recharge the traction battery 3 when the motor vehicle is in a charging station.

The motor vehicle moreover comprises a range extending system.

This range extending system comprises a range extender 1 and a first cooling circuit 10 for this range extender 1.

The range extender 1 is designed to supply the electric motor 2 (or the traction battery 3) with current. It is controlled between an activated state, in which it supplies a non-zero electrical power Pe, and a deactivated state in which it does not power any electrical component of the vehicle.

It may be a metal-air battery (for example of the aluminium-air type), an internal combustion engine coupled to an alternator, or even a fuel cell.

This range extender 1 has an optimum temperature Topt at which its efficiency is maximum.

As an indication, this optimum temperature Topt varies between 55 and 75° C. when the range extender 1 is an aluminium-air battery using an electrolyte (55° C. for an electrolyte in the new state and 75° C. for an electrolyte at end of life). However, it is equal to 90° C. (for the coolant) in the case where the range extender is an internal combustion engine.

This range extender 1 moreover has a maximum temperature Tmax beyond which it risks being damaged.

As an indication, this maximum temperature Tmax is equal to 75° C. when the range extender is an aluminium-air battery. However, it is equal to 110° C. in the case where the range extender is an internal combustion engine.

The cooling circuit 10 is then designed in such a way as to keep the temperature T of the range extender 1 at a value below this maximum temperature Tmax.

This cooling circuit 10 is very schematically represented in FIG. 1. It notably comprises a first heat exchanger, called radiator 11, which is situated at the front of the motor vehicle and which makes it possible to cool the coolant which passes through it. It also comprises a pump 12 which is connected in series with the radiator 11, and a unit heater 13 and an exchanger (called cooler 14) connected in parallel to one another and in series with the pump 12. The unit heater 13 makes it possible to heat up, if necessary, the air in the vehicle interior, while the cooler 14 is specifically designed to cool the range extender 1. Valves which are not represented make it possible to regulate the flow rate of coolant circulating through the unit heater 13 and the cooler 14.

Here, another cooling circuit 20 is also provided, distinct from the first, which is very schematically represented in FIG. 1. It notably comprises a second heat exchanger, called radiator 21, which is situated at the front of the motor vehicle and which makes it possible to cool the coolant which passes through it. It also comprises a pump 22 which is connected in series with the radiator 21, and two exchangers 23, 24 connected in parallel to one another and in series with the pump 22. These two exchangers 23, 24 are respectively designed to cool the electronic components of the electric motor 2 and the charger 4. They could also be used to cool the electric motor if the latter were cooled for the same heat transfer fluid. In our example, it is cooled by another means, for example by air. Valves which are not represented make it possible to regulate the flow rate of coolant circulating through the two exchangers 23, 24.

A fan (not represented) makes it possible to force the circulation of air over the radiators 11, 21, notably when the vehicle is stopped, to promote the heat exchanges between the outside air and the coolant.

The use of two distinct cooling circuits 10, 20 makes it possible to cool the range extender 1 to a desired temperature, distinct from the temperature of the charger 4 or of the other electronic components for example.

As a variant, it would be possible to envisage using one and the same global cooling circuit for all the components of the motor vehicle, in which case, this global circuit would have a sub-circuit equipped with its own radiator to cool some of the components of the vehicle more than others. In this variant, it would therefore also be possible to cool the range extender to the desired temperature.

Finally, the motor vehicle is equipped with a computer (not represented) to control its various components, notably the pumps 12, 22, the electric motor 2 and the range extender 1.

This computer conventionally comprises a processor, a random-access memory, a read-only memory, and various input and output interfaces.

By virtue of its input interfaces, the computer is adapted to receive input signals from different sensors.

Among these input signals, the computer receives:
the outside temperature Te, measured by a probe situated at the front of the motor vehicle,
the state of charge SOC of the traction battery 3, computed using notably the value of the voltage measured at the terminals of the traction battery 3 by a voltmeter (this state of charge is expressed as a percentage and lies between 0% and 100% when the battery is charged), and
the temperature T of the coolant passing through the cooler 14, that will here be considered equal to the temperature T of the range extender. In the case of a range with an electrolyte, for example of aluminium-air battery type, it is considered that the temperature T is the temperature of the electrolyte passing through the cooler 14 and cooled by the coolant.

By virtue of a predetermined mapping on a test bench and installed in its read-only memory, the computer is adapted to generate, for each condition of operation of the vehicle, setpoint signals.

Finally, by virtue of its output interfaces, the controller is adapted to transmit these setpoint signals to the different members of the motor, notably to the range extender 1 and to the pump 12 of the cooling circuit 10.

The method for generating these setpoint signals, which make it possible to control the pump 12 and the range extender 1 in such a way that the latter can fulfil its function optimally, can now be described.

During a first step, the computer reads, in its random-access memory, the instantaneous values of the outside temperature Te, of the state of charge SOC and of the temperature T of the range extender 1.

As long as the outside temperature Te remains below a predetermined temperature threshold Ts, for example equal to 30° C., the computer proceeds in a conventional manner.

It proceeds more specifically as follows.

If the state of charge SOC of the traction battery 3 is above a determined charge threshold SOCmin (for example equal to 20%), it is considered that there is no need to activate the range extender 1. Only the traction battery 3 then powers the electric motor 2 to propel the motor vehicle.

On the other hand, if the state of charge SOC of the traction battery 3 passes below this charge threshold SOCmin of 20%, the range extender 1 is activated to supply the traction battery and/or the electric motor with current (in addition to the traction battery 3, or even in place thereof).

For this, the computer controls the range extender 1 in such a way that it develops a nominal electrical power Pnom (this nominal electrical power Pnom being optimized to maximize the efficiency of the range extender 1).

The computer simultaneously controls the pump 12 to the deactivated state as long as the temperature T of the range extender is below the optimum temperature Topt, then to the activated state as soon as the temperature T of the range extender 1 reaches the optimum temperature Topt. The pump 12 is then controlled in such a way that the temperature T of the range extender 1 remains equal to the optimum temperature Topt.

On the other hand, when the heat conditions encountered become limiting inasmuch as there is a risk, ultimately, of the cooling circuit 10 no longer being able to keep the temperature T of the range extender 1 at the optimum temperature Topt, the control of the pump 12 and of this range extender 1 is performed differently.

Thus, according to a particularly advantageous feature of the invention, when the outside temperature Te exceeds the temperature threshold Ts, the computer assigns the charge threshold SOCmin a new value (for example 50%).

This new value is chosen to be greater than the value used previously (when the outside temperature Te was below the temperature threshold Ts).

Consequently, when the outside temperature Te exceeds the temperature threshold Ts, the range extender 1 is controlled to be activated earlier, when the traction battery 3 is again well charged.

The pump 12 is therefore also controlled in the activated state earlier. Because of this, the cooling circuit 10 begins to cool the coolant and the range extender 1 earlier, which makes it possible to have a better chance of encountering conditions favourable to this cooling (vehicle running at a brisk pace). It is therefore also possible to arrange not to have to use the fan, which increases the range of the vehicle.

Moreover, with this new charge threshold value SOCmin, by starting the range extender earlier, it is possible to reduce the electrical power of the range extender to a sufficient value. This makes it possible to retain the optimum temperature Topt.

Moreover, preferentially, when the outside temperature Te exceeds the temperature threshold Ts, the pump 12 is controlled in such a way that the temperature T of the range extender 1 can exceed the optimum temperature Topt (inasmuch as it remains below the maximum temperature Tmax).

By virtue of this, the range extender 1 can then continue to be controlled in such a way as to develop its nominal electrical power Pnom, as long as its temperature T remains below the maximum temperature Tmax.

In practice, there is therefore no longer an aim to limit the temperature T of the range extender 1 to the optimum temperature Topt to favour the efficiency of the range extender 1. Rather, it is arranged for the latter to develop a desired electrical power Pe in order to best relieve the traction battery 3.

The major advantage of this solution is that it favours the temperature rise of the coolant. Now, the higher its temperature becomes, the more it deviates from the outside temperature Te, and the better the efficiency of the radiator 11 becomes. Consequently, it is possible to sustainably limit the increase in the temperature T of the range extender 1, so that the latter can be controlled for a long time in the activated state, before reaching its maximum temperature Tmax.

Preferentially, when the outside temperature Te is above the temperature threshold Ts and after the range extender 1 has been deactivated, the pump 12 continues to be controlled in the activated state so as to rapidly reduce the temperature T of the range extender 1 to just below a predetermined limit temperature Tl.

In this way, when the range extender 1 is reused, it will have a temperature T that is as low as possible, which will accordingly extend the time it operates before it reaches the maximum temperature Tmax.

For this cooling, the pump 12 will be used at its maximum potential as soon as the speed Va of the vehicle is above a predetermined speed threshold (for example 50 km/h).

Figure 2:
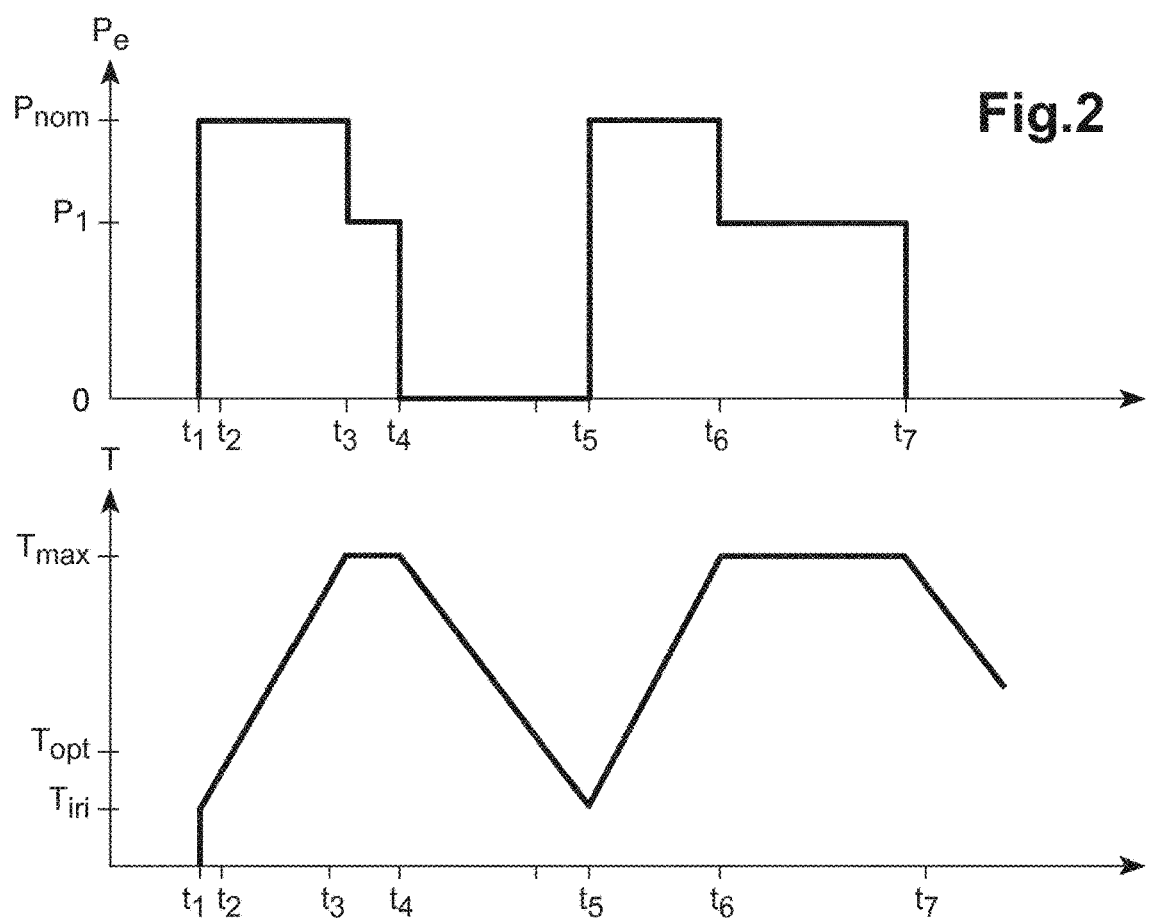
FIG. 2 shows two curves respectively schematically representing the trend of the electrical power developed by the range extender of the motor vehicle of FIG. 1 and the trend of its temperature during a cycle of use of the motor vehicle.

FIG. 2 illustrates an exemplary running cycle of the motor vehicle, making it possible to clearly understand how the invention works in practice.

Before the instant denoted t1, the computer measures the outside temperature Te.

If the latter were below the temperature threshold Ts, the computer would assign a reduced value to the charge threshold SOCmin.

It will be considered here that this outside temperature Te is particularly high, for example equal to 40° C.

The computer therefore assigns a high value, for example equal to 50%, to the charge threshold SOCmin.

At the instant t1, the state of charge SOC of the traction battery 3 reaches 50%.

Consequently, the range extender 1 is started up so as to deliver the nominal electrical power Vnom.

The temperature T of the range extender 1 therefore rises progressively to reach, at the instant t2, an initiation temperature Tini.

At this initiation temperature Tini, it is considered that the difference in temperature between the coolant and the outside air is sufficient to insure a cost-efficient cooling (in terms of electrical energy) of the range extender 1. The computer then controls the pump 12 to the activated state even though the temperature T of the range extender 1 has not reached the optimum temperature Topt (the objective being to slow down as much as possible the temperature rise of this range extender). It is in fact observed that, after this instant t2, the temperature T of the range extender 1 rises less quickly.

Here, the pump 12 is controlled at its nominal speed, so as to reduce as far as possible this temperature rise.

The setpoints for controlling the pump 12 and the range regulator 1 are then maintained when the temperature T of the range extender 1 reaches the optimum temperature Topt. In this way, the range extender continues to deliver to the electric motor 2 the nominal electrical power Pnom, which favours the range of the vehicle.

These controlling setpoints are here established according to an energy management law that takes into account the efficiency of the range extender 1 and the electrical consumption of the auxiliary components of the vehicle (air conditioner, pumps, fan, etc.) in order to find the best operating point of the range regulator 1.

As a variant, these controlling setpoints could also be established as a function of more parameters, for example as a function of the lifetime of the range extender, of the charge and discharge cycles of the traction battery, of the duration and the length of the journey travelled by the vehicle, etc.

At this instant, the computer can, if the state of charge SOC is still relatively high, reduce the electrical power of the range extender in order to reduce the need for cooling of the range extender and retain a temperature equal or close to the optimum temperature Topt.

Otherwise, the temperature T of the range extender 1 continues to rise to the instant t3 when it reaches the maximum temperature Tmax.

In FIG. 2, the temperature rise between the instants t2 and t3 is represented as being linear. In practice, it becomes increasingly less fast, because of the efficiency of the radiator 11 which increases when the temperature of the coolant increases.

At the instant t3, the computer controls the range extender either to the deactivated state, or in such a way that it develops an electrical power P1 below the nominal electrical power Pnom (see FIG. 2). In this way, the range extender 1 heats less, so that the cooling circuit 10 is able to limit the temperature T of the range extender 1 to the maximum temperature Tmax.

Here, since the state of charge SOC of the traction battery 3 is still high, provision can be made for this traction battery 3 to develop the electrical power needed to complement the drop in power developed by the range extender 1.

At the instant t4, the computer deactivates the range extender 1 (for example because the traction battery has reached a desired state of charge SOC or because the electric motor 2 is stopped by the driver).

The pump 12 is however kept in the active state, so that the temperature T of the range extender 1 decreases as rapidly as possible.

Thus, when, at the instant t5, the computer reactivates the range extender, the latter is able to develop a nominal electrical power Pnom over the longest possible period, to the instant t6.

At this instant t6, the computer once again controls the range extender 1 in such a way that the latter develops an electrical power P1 below the nominal electrical power Pnom, until the range extender 1 is deactivated at the instant t7.

The present invention is in no way limited to the embodiment described and represented, but a person skilled in the art will be able to apply any variant in accordance with its spirit thereto.

Thus, provision could be made for the computer to assign to the charge threshold SOCmin a variable value according to the outside temperature Te (for example 40% at 30° C. and 50% at 40° C.).

According to another variant, provision could be made for the computer to assign to the charge threshold SOCmin a variable value that is a function not only of the outside temperature Te, but also of other parameters such as the speed of the vehicle (provision can be made to increase the value of the charge threshold only if the vehicle moves at a sufficient speed), the on or off state of the interior air conditioner, etc.

The invention claimed is:

1. A method for controlling a range extending system for a motor vehicle equipped with an electric motor adapted to be supplied with electric current by a traction battery, said range extending system comprising:
    a range extender activatable to supply the electric motor or the traction battery with electric current, said range extender being controlled between an activated state in which said range extender supplies the electric motor with a non-zero electrical power $P_e$, and a deactivated state in which said range extender does not power any electrical component of the vehicle; and
    a cooling circuit to cool the range extender,
    wherein the range extender is controlled between the activated state and the deactivated state as a function of at least an outside temperature of air outside the motor vehicle.

2. The control method according to claim 1, in which provision is made to acquire a state of charge of the traction battery and, if said state of charge is below a charge threshold, to activate the range extender, the charge threshold having a variable value, which is a function at least of the outside temperature.

3. The control method according to claim 1, in which, given an optimum temperature range when the range extender is activated and the outside temperature is below a temperature threshold, the cooling circuit is controlled in such a way that the cooling circuit keeps the range extender at the optimum temperature.

4. The control method according to claim 3, in which the optimum temperature is the temperature at which the range extender exhibits a maximum efficiency.

5. The control method according to claim 3, in which, given a maximum temperature range when the range extender is activated and the outside temperature is above said temperature threshold, the cooling circuit and the range extender are controlled in such a way that the range extender exhibits a temperature above the optimum temperature and below or equal to the maximum temperature.

6. The control method according to claim 5, in which the maximum temperature is a temperature beyond which the range extender risks being damaged.

7. The control method according to claim 3, in which, when the range extender is activated and the outside temperature is above said temperature threshold, the cooling circuit and the range extender are controlled as a function of the speed of the motor vehicle.

8. The control method according to claim 5, in which, when the outside temperature is above said temperature threshold, the cooling circuit is controlled in the activated state as soon as the range extender exhibits a temperature above a starting threshold which is strictly below the optimum temperature.

9. The control method according to claim 5, in which, the motor vehicle comprising an interior and an air conditioner adapted to cool the interior, when the range extender is activated and the outside temperature is above said temperature threshold, the cooling circuit and the range extender are controlled as a function of the electrical power consumed by the air conditioner.

10. The control method according to claim 1, in which, when the outside temperature is above a temperature threshold, after the range extender had been deactivated, the cooling circuit is controlled in the activated state in such a way that the cooling circuit reduces the temperature of the range extender to just below a predetermined limit temperature.

11. The control method according to claim 2, in which, given an optimum temperature range when the range extender is activated and the outside temperature is below a temperature threshold, the cooling circuit is controlled in such a way that the cooling circuit keeps the range extender at the optimum temperature.

12. The control method according to claim 4, in which, given a maximum temperature range when the range extender is activated and the outside temperature is above said temperature threshold, the cooling circuit and the range extender are controlled in such a way that the range extender exhibits a temperature above the optimum temperature and below or equal to the maximum temperature.

13. The control method according to claim 4, in which, when the range extender is activated and the outside temperature is above said temperature threshold, the cooling circuit and the range extender are controlled as a function of the speed of the motor vehicle.

14. The control method according to claim 5, in which, when the range extender is activated and the outside temperature is above said temperature threshold, the cooling circuit and the range extender are controlled as a function of the speed of the motor vehicle.

15. The control method according to claim 6, in which, when the range extender is activated and the outside temperature is above said temperature threshold, the cooling circuit and the range extender are controlled as a function of the speed of the motor vehicle.

16. The control method according to claim 6, in which, when the outside temperature is above said temperature threshold, the cooling circuit is controlled in the activated state as soon as the range extender exhibits a temperature above a starting threshold which is strictly below the optimum temperature.

17. The control method according to claim 7, in which, when the outside temperature is above said temperature threshold, the cooling circuit is controlled in the activated state as soon as the range extender exhibits a temperature above a starting threshold which is strictly below the optimum temperature.

18. The control method according to claim 6, in which, the motor vehicle comprising an interior and an air conditioner adapted to cool the interior, when the range extender is activated and the outside temperature is above said temperature threshold, the cooling circuit and the range extender are controlled as a function of the electrical power consumed by the air conditioner.

19. The control method according to claim 7, in which, the motor vehicle comprising an interior and an air conditioner adapted to cool the interior, when the range extender is activated and the outside temperature is above said temperature threshold, the cooling circuit and the range extender are controlled as a function of the electrical power consumed by the air conditioner.

20. The control method according to claim 8, in which, the motor vehicle comprising an interior and an air conditioner adapted to cool the interior, when the range extender is activated and the outside temperature is above said temperature threshold, the cooling circuit and the range extender are controlled as a function of the electrical power consumed by the air conditioner.

\* \* \* \* \*